(12) United States Patent
Wang et al.

(10) Patent No.: US 11,086,158 B2
(45) Date of Patent: Aug. 10, 2021

(54) ARRAY SUBSTRATE, DISPLAY PANEL AND MAN-MACHINE INTERACTIVE TERMINAL

(71) Applicant: BOE TECHNOLOGY GROUP CO., LTD., Beijing (CN)

(72) Inventors: Pengpeng Wang, Beijing (CN); Xue Dong, Beijing (CN); Haisheng Wang, Beijing (CN); Chunwei Wu, Beijing (CN); Xiaoliang Ding, Beijing (CN); Chihjen Cheng, Beijing (CN); Wei Liu, Beijing (CN); Yanling Han, Beijing (CN); Xueyou Cao, Beijing (CN); Ping Zhang, Beijing (CN); Changfeng Li, Beijing (CN); Yanan Jia, Beijing (CN); Yuzhen Guo, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 0 days.

(21) Appl. No.: 16/069,764

(22) PCT Filed: Dec. 18, 2017

(86) PCT No.: PCT/CN2017/116881
§ 371 (c)(1),
(2) Date: Jul. 12, 2018

(87) PCT Pub. No.: WO2018/209949
PCT Pub. Date: Nov. 22, 2018

(65) Prior Publication Data
US 2021/0026178 A1    Jan. 28, 2021

(30) Foreign Application Priority Data
May 16, 2017  (CN) .......................... 201710342479.0

(51) Int. Cl.
*G02F 1/1333* (2006.01)
*G02F 1/1368* (2006.01)
(Continued)

(52) U.S. Cl.
CPC ........ *G02F 1/13338* (2013.01); *G02F 1/1368* (2013.01); *G06F 3/017* (2013.01); *H01Q 1/243* (2013.01); *H01Q 1/526* (2013.01)

(58) Field of Classification Search
CPC combination set(s) only.
See application file for complete search history.

(56) References Cited

U.S. PATENT DOCUMENTS

2004/0064717 A1\* 4/2004 Tada .................... G11B 23/042
                                                          713/193
2006/0220864 A1\* 10/2006 Sano ................. G06K 19/07749
                                                          340/572.1
(Continued)

FOREIGN PATENT DOCUMENTS

CN     101105839 A      1/2008
CN     101308266 A     11/2008
(Continued)

OTHER PUBLICATIONS

First Office Action for CN Application No. 21710342479.0, dated May 5, 2019, 9 pages.
(Continued)

*Primary Examiner* — Van N Chow
(74) *Attorney, Agent, or Firm* — Dinsmore & Shohl LLP

(57) ABSTRACT

The present disclosure provides an array substrate, comprising a substrate and a display element arranged above the substrate. The array substrate further comprises an antenna structure for transmitting and receiving electromagnetic waves. The antenna structure comprises a signal shielding layer and an antenna patch layer arranged on the substrate.
(Continued)

The antenna patch layer and the signal shielding layer are spaced apart through a dielectric layer. The antenna patch layer is beneath the signal shielding layer such that the antenna structure transmits electromagnetic waves towards the bottom of the substrate and receives the electromagnetic waves from the bottom of the substrate. The present disclosure further provides a display panel and a man-machine interactive terminal.

20 Claims, 3 Drawing Sheets

(51) Int. Cl.
    *G06F 3/01*     (2006.01)
    *H01Q 1/24*     (2006.01)
    *H01Q 1/52*     (2006.01)

(56) References Cited

U.S. PATENT DOCUMENTS

2008/0278384 A1* 11/2008 Shimasaki ............. H01Q 13/10
    343/702
2009/0133922 A1* 5/2009 Okazaki ............... H05K 9/0096
    174/389
2015/0001501 A1* 1/2015 Cho ..................... H01L 51/5246
    257/40
2019/0198979 A1* 6/2019 Cao ........................ H01Q 21/08

FOREIGN PATENT DOCUMENTS

| | | |
|---|---|---|
| CN | 101889226 A | 11/2010 |
| CN | 101889227 A | 11/2010 |
| CN | 102749770 A | 10/2012 |
| CN | 104022106 A | 9/2014 |
| CN | 204230241 U | 3/2015 |
| CN | 104485334 A | 4/2015 |
| CN | 105094231 A | 11/2015 |
| WO | WO-2016/190648 A1 | 12/2016 |

OTHER PUBLICATIONS

International Search Report and Written Opinion for International Appl. No. PCT/CN2017/116881, dated Mar. 19, 2018.

* cited by examiner

ARRAY SUBSTRATE, DISPLAY PANEL AND MAN-MACHINE INTERACTIVE TERMINAL

CROSS-REFERENCE TO RELATED APPLICATIONS

The present patent application claims priority under 35 U.S.C. § 371 to International Patent Application No. PCT/CN2017/116881 filed on Dec. 18, 2017, which claims priority to the Chinese patent application No. 201710342479.0 filed on May 16, 2017, the disclosure of each of which is hereby incorporated by reference into the present application for all purposes.

TECHNICAL FIELD

Embodiments of the present disclosure relate to an array substrate, a display panel, and a man-machine interactive terminal.

BACKGROUND

Gesture recognition technologies have a long history, and personalized gesture operations provide a lot of convenience to the life. In the use of end products, positive, related touch and gesture recognitions can no longer meet the demands of people, especially in the field of deep interaction such as game, motion sensing, virtual reality. A full range of amazing operating experiences is the ultimate goal of people.

The radar measurement and control technology judges gesture actions by transmitting electromagnetic waves and receiving the reflected electromagnetic waves, to realize man-machine interactive functions such as gesture recognition, motion sensing recognition. As compared with related optical or dual-camera or ultrasonic man-machine interactive technologies, the radar measurement and control technology has outstanding advantages such as without ambient light and temperature interference, with high precision and easy miniaturization.

SUMMARY

An aspect of this disclosure provides an array substrate, comprising a substrate and a display element arranged above the substrate. The array substrate further comprises an antenna structure for transmitting and receiving electromagnetic waves. The antenna structure comprises a signal shielding layer and an antenna patch layer arranged on the substrate. The antenna patch layer and the signal shielding layer are spaced apart through a dielectric layer. The antenna patch layer is beneath the signal shielding layer such that the antenna structure transmits electromagnetic waves towards the bottom of the substrate and receives the electromagnetic waves from the bottom of the substrate.

In some embodiments, the display element comprises a thin film transistor and a pixel electrode. The thin film transistor and the pixel electrode both are above the signal shielding layer.

In some embodiments, the signal shielding layer is on an upper surface of the substrate. The antenna patch layer is arranged on a lower surface of the substrate. The substrate acts as the dielectric layer.

In some embodiments, the signal shielding layer is arranged beneath the substrate.

In some embodiments, the display element further comprises a common electrode. The signal shielding layer and the antenna patch layer both are above the substrate. The thin film transistor, the pixel electrode and the common electrode all are above the signal shielding layer.

In some embodiments, the display element further comprises a common electrode. An insulating layer is provided on a side of the substrate, wherein the substrate and the insulating layer both are between the antenna patch layer and the signal shielding layer to act together as the dielectric layer. The thin film transistor, the pixel electrode and the common electrode all are arranged above the signal shielding layer.

In some embodiments, each display period of a display panel into which the array substrate is incorporated is divided into a display phase and a recognition phase, and the signal shielding layer is used for receiving a reference voltage signal in the recognition phase and receiving a common voltage signal in the display phase, to be reused as a common electrode.

In some embodiments, the antenna patch layer comprises a plurality of antenna patches spaced apart, the plurality of antenna patches are arranged in multiple rows and multiple columns, and the substrate comprises a display area and a non-display area surrounding the display area. The display area and the non-display area both are provided with a plurality of antenna patches.

In some embodiments, the antenna patch layer comprises a plurality of antenna patches spaced apart, the plurality of antenna patches are divided into two groups, and the two groups of antenna patches are respectively located on either side of the substrate along its length direction or width direction.

Another aspect of this disclosure provides a display panel comprising the above array substrate provided in this disclosure and a counter substrate arranged in a counter manner with respect to the array substrate.

Another aspect of this disclosure provides a man-machine interactive terminal, comprising the above display panel provided in this disclosure and a drive chip electrically connected with the antenna structure.

In some embodiments, a side edge of the array substrate goes beyond a corresponding edge of the counter substrate, a portion of the array substrate going beyond the counter substrate is provided with a conductive part, the antenna patch layer comprises a plurality of antenna patches spaced apart, and each antenna patch is electrically connected with the conductive part. The man-machine interactive terminal further comprises a circuit board on which a connecting line is provided, and the drive chip is on the circuit board and electrically connected with the conductive part through the connecting line on the circuit board.

In some embodiments, the antenna patch layer comprises a plurality of antenna patches spaced apart. The drive chip is on the substrate, and there are a plurality of the drive chips electrically connected with the antenna patches one by one.

BRIEF DESCRIPTION OF THE DRAWINGS

The accompanying drawings, which constitute a part of the specification, provides a further understanding of this disclosure and, together with the following embodiments, serve to explain the present disclosure, but do not constitute limitations to the present disclosure, in which.

DETAILED DESCRIPTION

Figure 1:
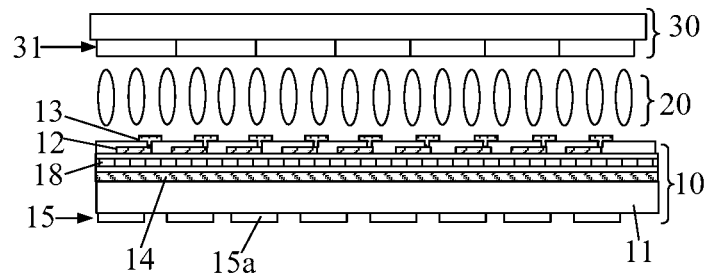
FIG. 1 is a schematic diagram showing a first structure of a display panel in an embodiment of the present disclosure.

The embodiments of the present disclosure will be described in detail below in combination with the accompanying drawings. It should be appreciated that, the embodiments described herein only serve to describe and explain the present disclosure, and are not used for limiting the present disclosure.

In the man-machine interactive terminals using radar measurement and control technology in the related art, the display screen and the antenna structure used for transmitting and receiving electromagnetic waves are manufactured separately as follows: first respectively manufacturing the antenna patch layer and the reference layer on either side of the dielectric plate to form an antenna structure; then welding the antenna structure to a drive main board of the interactive terminal, and then assembling with the display screen. Such a method results in a lower integration level of the interactive terminal and a comparatively complex structure.

In this disclosure, the antenna structure is integrated on the array substrate, which improves the integration level of the product and simplifies the whole structure. Moreover, the antenna structure can be manufactured together in the process of manufacturing the array substrate, which eliminates the need of a separate process and improves the production efficiency. The signal shielding layer of the antenna structure can shield the electromagnetic waves transmitted and received by the antenna structure from the electric field in the time of display, which guarantees that the screen display and transmitting and receiving of the electromagnetic waves do not interfere with each other. In addition, the substrate of the array substrate can act as the dielectric layer in the antenna structure, which further reduces the thickness of the array substrate.

Since the display panel adopts the array substrate above, the integration level of the display panel can be improved, which can further improve the integration level of the man-machine interactive terminal and reduce the overall thickness of the man-machine interactive terminal. Moreover, in the man-machine interactive terminal, the drive chip may correspond, at a one-to-one basis, to the antenna patch, and may be arranged at a position on the substrate adjacent to the antenna patch, which can reduce the length of the signal line, and improve the signal-to-noise ratio and the accuracy of motion detection.

As an aspect of this disclosure, an array substrate is provided, and FIG. 1 to FIG. 6 are schematic diagrams showing the display panel of the array substrate with different structures respectively. As shown in FIG. 1 to FIG. 6, the array substrate 10 comprises a substrate 11 and a display element above the substrate 11. The display element refers to a structure for displaying, when the array substrate is used in the display panel. The display element comprises at least a thin film transistor 12 and a pixel electrode 13. The array substrate 10 further comprises an antenna structure for transmitting and receiving electromagnetic waves. The antenna structure comprises a signal shielding layer 14 and an antenna patch layer 15 above the substrate 11. The antenna patch layer 15 and the signal shielding layer 14 are spaced apart through a dielectric layer, and the antenna patch layer 15 is beneath the signal shielding layer 14, such that the antenna structure transmits electromagnetic waves towards the bottom of the substrate 11 and receives the electromagnetic waves from the bottom of the substrate 11. "Above" in this disclosure refers to a display side when the array substrate is used in the display panel, and "beneath" refers to a side away from the display side.

The signal shielding layer 14 may be used for receiving a reference signal (for example, grounding the signal shielding layer 14), to act as a reference layer of the antenna structure. The antenna patch layer 15 comprises a plurality of antenna patches 15a made of metal, metal grids or transparent conductive material (such as indium tin oxide, etc.). The shape of the antenna patch 15a is not limited, and may be ring, round, microstrip line and etc. The signal shielding layer 14, together with the antenna patch layer 15 and the dielectric layer, serves as the antenna structure to transmit and receive electromagnetic waves.

In this disclosure, since the signal shielding layer 14 and the antenna patch layer 15 both are on the substrate 11, that is, the antenna structure is integrated into the array substrate 10, the man-machine interactive terminal using the array substrate 10 has a higher integration level and a simplified structure. Moreover, the antenna structure can be manufactured together in the process of manufacturing the array substrate 10, which eliminates the need of a separate process and improves the production efficiency. The antenna structure transmits the electromagnetic waves downwards, and receives the electromagnetic waves from the bottom of the substrate 11, which can reduce the interference of electromagnetic waves to the display as much as possible.

The substrate 11 comprises a display area and a non-display area surrounding the display area. The display area comprises a plurality of pixel cells. The display element comprises a thin film transistor 12 and a pixel electrode 13 arranged in each pixel cell, and the thin film transistor 12 and the pixel electrode 13 both are above the signal shielding layer 14.

Figure 2:
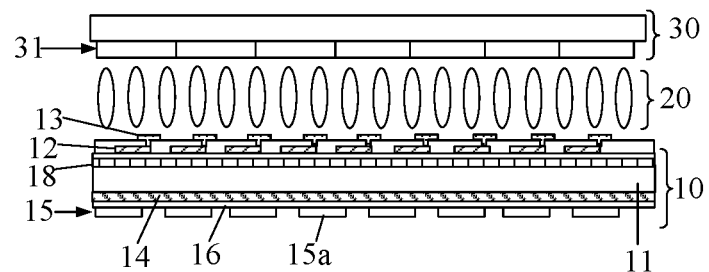
FIG. 2 is a schematic diagram showing a second structure of a display panel in an embodiment of the present disclosure.
Figure 3:
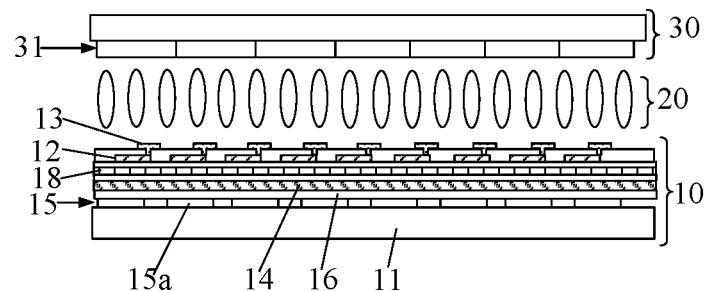
FIG. 3 is a schematic diagram showing a third structure of a display panel in an embodiment of the present disclosure.
Figure 4:
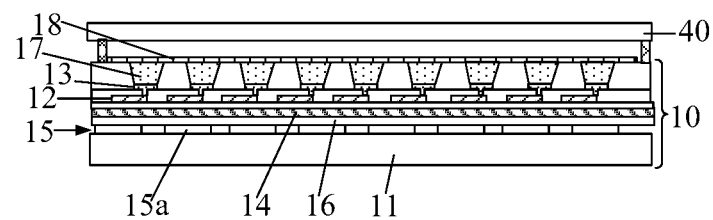
FIG. 4 is a schematic diagram showing a fourth structure of a display panel in an embodiment of the present disclosure.
Figure 5:
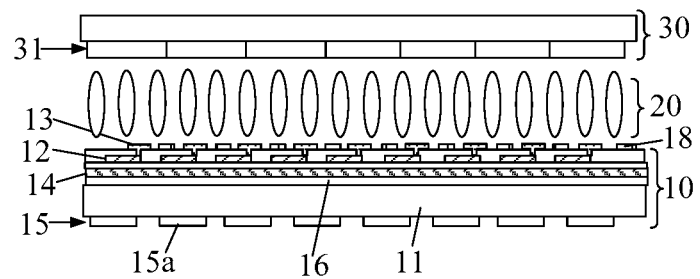
FIG. 5 is a schematic diagram showing a fifth structure of a display panel in an embodiment of the present disclosure.

The display element may further comprise a common electrode 18. The array substrate 10 may be used in a liquid crystal display (LCD) panel (shown in FIGS. 1 to 3, FIG. 5 and FIG. 6) or in a self-luminous display panel (shown in FIG. 4). When the array substrate 10 is used in the LCD panel, the common electrode 18 can be an entire electrode layer beneath the layer where the pixel electrode 13 is in, as shown in FIG. 1 to FIG. 3; or can be electrode strips in the same layer with and alternately arranged with the pixel electrode 13, as shown in FIG. 5. When the array substrate 10 is used in the self-luminous display panel, as shown in FIG. 4, the display element may further comprise a self-luminous unit 17 above the substrate, for example, an organic electroluminescent unit OLED. The pixel electrode 13 is an anode beneath the self-luminous unit, and the common electrode 18 is a cathode layer above the self-luminous unit 17; at this time, the self-luminous unit 17 is also above the signal shielding layer.

Several specific settings for the antenna structure in this disclosure are discussed below with respect to FIGS. 1 to 6.

A first setting of the antenna structure is shown in FIG. 1, in which the signal shielding layer 14 is on an upper surface of the substrate 11, the antenna patch layer 15 is on a lower surface of the substrate 11, and the substrate 11 acts as the dielectric layer, that is, the signal shielding layer 14, the antenna patch layer 15 and the substrate 11 form the antenna structure. The substrate 11 may be a glass substrate, and by selecting glass with an appropriate dielectric constant, performance parameters of the antenna structure can be adjusted. In such a structure, it is not needed to separately provide a dielectric layer between the signal shielding layer 14 and the antenna patch layer 15, thereby reducing the overall thickness of the array substrate. Meanwhile, since the signal shielding layer 14 is directly formed on the upper surface of the substrate 11, i.e., the structures such as the thin film transistor 12 and the pixel electrode 13 on the array substrate 10 all are above the signal shielding layer 14. Thus, the signal shielding layer 14, on the one hand, acts as the reference layer of the antenna structure, such that the antenna structure can transmit downwards, or receive downwards the electromagnetic waves, without interference from other conductive structures; and, on the other hand, has a function of signal shielding, to prevent the electromagnetic waves transmitted and received by the antenna structure from entering the electric field generated by the common electrode 18 and the pixel electrode 13, so as to guarantee that the screen display and transmitting and receiving of the electromagnetic waves do not interfere with each other. It should be understood that, in the self-luminous display panel, the antenna structure can also adopt the setting in FIG. 1.

A second setting of the antenna structure is shown in FIG. 2, in which the signal shielding layer 14 is beneath the substrate 11. Specifically, the signal shielding layer 14 can be directly on the lower surface of the substrate 11; the antenna patch layer 15 is beneath the signal shielding layer 14; there is an insulating layer 16 between the antenna patch layer 15 and the signal shielding layer 14, to act as the dielectric layer of the antenna structure. Similar to the setting in FIG. 1, the setting in FIG. 2 can guarantee that the screen display and transmitting and receiving of the electromagnetic waves do not interfere with each other. In addition, in the organic electroluminescent display panel, the antenna structure can also adopt the setting in FIG. 2.

A third setting of the antenna structure is shown in FIG. 3 and FIG. 4, in which the signal shielding layer 14 and the antenna patch layer 15 both are above the substrate 11, and the thin film transistor 12, the pixel electrode 13 and the common electrode 18 are all above the signal shielding layer 14. When the array substrate 10 is used in the self-luminous display panel, as shown in FIG. 4, the self-luminous unit 17 is also above the signal shielding layer 14. Similar to the second setting, when the antenna patch layer 15 and the signal shielding layer 14 both are above the substrate 11, the dielectric layer between the antenna patch layer 15 and the signal shielding layer 14 is the insulating layer 16 other than the substrate 11. Similar to the first setting, when the third setting is used, the signal shielding function of the signal shielding layer 14 enables the transmitting and receiving of the electromagnetic waves not to interfere with the screen display either.

A fourth setting of the antenna structure is shown in FIG. 5, in which the signal shielding layer 14 is above the substrate 11, and the thin film transistor 12, the pixel electrode 13 and the common electrode all are above the signal shielding layer 14. There further comprises an insulating layer 16 on a side of the substrate 11, and the substrate 11 and the insulating layer 16 both are between the antenna patch layer 15 and the signal shielding layer 14, to collectively act as the dielectric layer. The insulating layer 16 can be, as shown in FIG. 5, on the upper surface of the substrate 11, or on the lower surface of the substrate 11. The setting of FIG. 5 can also guarantee that the screen display and the transmitting and receiving of the electromagnetic waves do not interfere with each other. Moreover, the dielectric constant of the substrate 11 and the dielectric constant of the insulating layer will affect the performance of the antenna structure, so when the combination of the substrate 11 and the insulating layer 16 acts as the dielectric layer of the antenna structure, the performance of the antenna structure is diversified.

Figure 6:
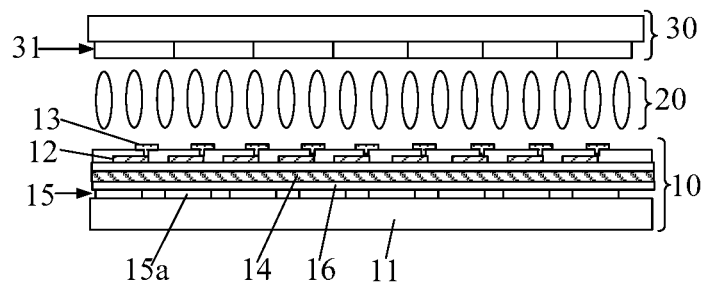
FIG. 6 is a schematic diagram showing a sixth structure of a display panel in an embodiment of the present disclosure.

A fifth setting of the antenna structure is shown in FIG. 6, in which the thin film transistor 12 and the pixel electrode 13 both are all above the signal shielding layer 14, and the signal shielding layer 14 is used for receiving a reference voltage signal (for example, ground) in a recognition phase, thereby acting as a reference layer of the antenna structure; and is used for receiving a common voltage signal in a display phase, thereby being reused as the common electrode. As mentioned above, the array substrate 10 can be used in the display panel, wherein each display period of the display panel can be divided into a display phase and a recognition phase. In the display phase, an electric field is generated between the signal shielding layer 14, as the common electrode, and the pixel electrode 13, so that liquid crystals are deflected for the screen display. In the recognition phase, the signal shielding layer 14 receives the reference voltage signal, such that the antenna structure transmits the electromagnetic waves downwards, thereby performing action recognition. Such a structure does not require separately manufacturing a common electrode for display any more, thus simplifying the whole structure of the array substrate 10, reducing the processing steps and reducing the overall thickness of the array substrate 10. Because the display phase and the recognition phase are carried out separately, the transmitting and receiving of the electromagnetic waves and the screen display do not interfere with each other.

In the fifth setting of the antenna structure, that is, when the signal shielding layer 14 is reused as the common electrode, the signal shielding layer 14 and the antenna patch layer 15 can be, as shown in FIG. 6, both above the substrate 11, and an insulating layer 16 is provided therebetween; or similar to the setting in FIG. 1, the signal shielding layer 14 and the antenna patch layer 15 are respectively arranged on the upper and lower surfaces of the substrate 11; or similar to the setting in FIG. 5, the signal shielding layer 14 and the antenna patch layer 15 are respectively arranged on either side of the substrate 11, and in addition to the substrate 11, there further comprises an insulating layer 16 between the signal shielding layer 14 and the antenna patch layer 15.

It should be further noted that, the antenna structure can be, as shown in FIGS. 1 to 5, covers the display area of the array base 10 (i.e., the area where the plurality of pixel cells are in), to prevent the border width from being affected. In this case, when the array substrate 10 is used in the LCD panel, the signal shielding layer 14 is a transparent layer made of a material such as indium tin oxide (ITO); when the array substrate 10 is used in the self-luminous display panel, the signal shielding layer 14 can be a non-transparent layer made of a metallic material, or a transparent layer made of a material such as indium tin oxide. Of course, the antenna structure can also be in the non-display area of the array substrate 10. In this case, the signal shielding layer 14 can be a transparent layer, or a non-transparent layer.

It should be understood that, when the thin film transistor 12 and the common electrode 18 are above the signal shielding layer 14, they are insulated and spaced from the signal shielding layer 14. FIGS. 1 to 6 are merely illustrative schematic diagrams, and the array substrate 10 has other structures which are not shown one by one in the figures.

Figure 7:
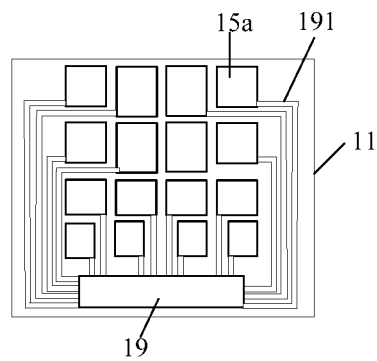
FIG. 7 is a schematic diagram showing a connection between the antenna patches and the conductive part in a first arrangement mode.

The antenna patch layer 15 in this disclosure comprises a plurality of antenna patches 15a spaced apart, and the plurality of antenna patches 15a can be distributed on the substrate in different ways. As shown in FIG. 7, the plurality of antenna patches 15a are arranged in multiple rows and multiple columns, the display area and the non-display area of the substrate 11 both have a plurality of antenna patches 15a, so that the antenna patch layer 15 covers the entire surface of the array substrate 10, and the antenna structure can transmit and receive electromagnetic waves in a wider range.

Figure 8:
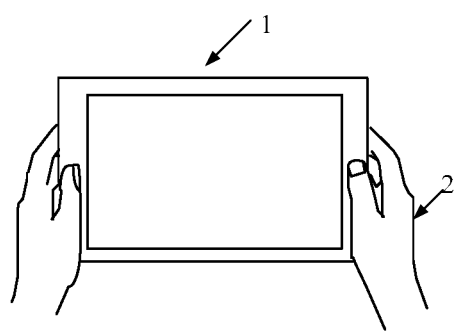
FIG. 8 is a schematic diagram showing an application scenario of a man-machine interactive terminal.
Figure 9:
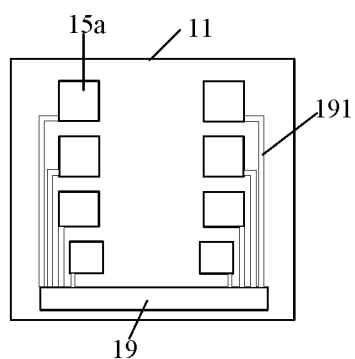
FIG. 9 is a schematic diagram showing a connection between the antenna patches and the conductive part in a second arrangement mode.

FIG. 8 is a schematic diagram showing a concrete application scenario in which the array substrate is applied to the man-machine interactive terminal 1. In FIG. 8, when the user holds the man-machine interactive terminal 1, the hands 2 are usually located on either side of the length direction, so when the array substrate 10 is used in this man-machine interactive terminal 1, the distribution of the antenna patches can be as shown in FIG. 9, wherein the plurality of antenna patches 15a are divided into two groups, and the two groups of antenna patches 15a are respectively located on either side of the substrate 11 along its length direction or width direction.

As another aspect of this disclosure, a display panel is provided, comprising the array substrate 10 and a counter substrate arranged opposite to the array substrate 10. The display panel can be a liquid crystal display panel. In this case, as shown in FIG. 1 to FIG. 3, FIG. 5 and FIG. 6, the counter substrate can be a color film substrate 30 comprising a color film layer 31, and there is a liquid crystal layer 20 between the array substrate 10 and the color film substrate 30; the display panel can also be a self-luminous display panel; in this case, as shown in FIG. 4, the display element on the array substrate 10 comprises the self-luminous unit 17, and the counter substrate is a package cover 40.

As a further aspect of this disclosure, a man-machine interactive terminal is provided, comprising the above display panel and a drive chip electrically connected with the antenna structure. The drive chip can provide a drive signal to the antenna structure, such that the antenna structure transmits the electromagnetic waves rearwards, and receive the electromagnetic waves reflected by the user; the drive chip can send an electrical signal corresponding to the electromagnetic waves transmitted and received by the antenna structure to a processing module of the man-machine interactive terminal, to judge the user's gesture action. The man-machine interactive terminal can be a mobile phone, a tablet computer, a game machine, a TV, etc. It should be understood that, in order not to affect the antenna structure from transmitting and receiving the electromagnetic waves, it should be guaranteed that the rear of the antenna structure cannot be shielded by metal.

As mentioned above, the antenna patch layer 15 comprises a plurality of antenna patches 15a, and in practical applications, according to the product (TV, tablet computer, mobile phone, etc.) applied to and the desired scenario (motion sensing recognition, gesture recognition, ranging, etc.), an appropriate radar band is selected, and a different recognition accuracy and antenna size is correspondingly obtained corresponding to a different band, for example, in a product for gesture recognition, the antenna patch 15a has a size of about 1 mm, and has a recognition accuracy up to 5 mm in a distance range of 5 cm~5 m. When a higher frequency band is adopted, the accuracy can be further improved and the size of the antenna patch 15a can be reduced.

For the setting position of the drive chip and the connection mode with the antenna patch 15a, this disclosure provides the following implementations.

As a first implementation, a side edge of the array substrate 10 goes beyond a corresponding edge of the counter substrate, a portion of the array substrate 10 going beyond the counter substrate is provided with a conductive part 19, each antenna patch 15a is electrically connected with the conductive part 19 through a signal line 191 (as shown in FIG. 7 and FIG. 9); the man-machine interactive terminal further comprises a circuit board (not shown) on which a connecting line is provided, and the drive chip is on the circuit board and electrically connected with the conductive part 19 through the connecting line on the circuit board.

Figure 10:
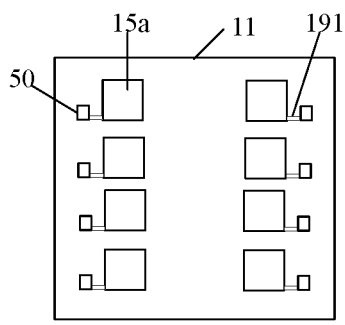
FIG. 10 is a schematic diagram showing a connection between the antenna patches and the drive chip in the second arrangement mode.

As a second implementation, as shown in FIG. 10, the drive chip 50 is on the substrate 11, there are a plurality of drive chips 50 corresponding, at a one-to-one basis, to the antenna patches 15a, and each antenna patch 15a is electrically connected with the corresponding drive chip 50 through the signal line 191; this allows each antenna patch 15a to be proximally connected with the drive chip 50, thereby reducing the length of the signal line 191, and thus improving the signal-to-noise ratio and motion detection accuracy. The drive chip 50 can be manufactured on the substrate 11 by means of Chip on Glass (COG) or micron Transfer print (μTP). When the implementation in which there are a plurality of such drive chips 50 arranged on the substrate 11 is adopted, the antenna patches 15a can be distributed as shown in the figure, for the convenience of the setting of the drive chips.

It can be seen from the discussions of the array substrate, the display panel and the man-machine interactive device provided in this disclosure that, in this disclosure, the antenna structure is integrated on the array substrate, which improves the integration level of the product and simplifies the whole structure; moreover, the antenna structure can be manufactured together in the process of manufacturing the array substrate, which eliminates the need of a separate process, and improves the production efficiency. The signal shielding layer of the antenna structure can shield the electromagnetic waves transmitted and received by the antenna structure from the electric field in the time of display, which guarantees that the screen display and the transmitting and receiving of the electromagnetic waves do not interfere with each other. In addition, the substrate of the array substrate can act as the dielectric layer in the antenna structure, which further reduces the thickness of the array substrate.

Since the display panel adopts the array substrate above, the integration level of the display panel can be improved, thereby improving the integration level of the man-machine interactive terminal, and reducing the overall thickness of the man-machine interactive terminal; moreover, in the man-machine interactive terminal, the drive chips may correspond, at a one-to-one basis, to the antenna patches, and may arranged at a position on the substrate adjacent to the antenna patch, which can reduce the length of the signal line and improve the signal-to-noise ratio and the motion detection accuracy.

It should be appreciated that, the above embodiments merely are illustrative embodiments adopted for explaining the principle of the present disclosure, but the present disclosure are not restricted thereto. Those skilled in the art could make various variations and improvements to the embodiments without departing from the spirit and essence of the present disclosure, and all these variations and improvements are also regarded as the scope of patent protection of the present disclosure.

What is claimed is:

1. An array substrate, comprising:
a substrate;
a display element arranged above the substrate; and
an antenna structure for transmitting and receiving electromagnetic waves, wherein the antenna structure comprises a signal shielding layer and an antenna patch layer arranged on the substrate, the antenna patch layer and the signal shielding layer are spaced apart through a dielectric layer, and the antenna patch layer is beneath the signal shielding layer such that the antenna structure transmits electromagnetic waves towards the bottom of the substrate and receives the electromagnetic waves from the bottom of the substrate;
wherein:
the display element comprises a thin film transistor and a pixel electrode, the thin film transistor and the pixel electrode both are above the signal shielding layer;
the display element further comprises a common electrode; and
the signal shielding layer and the antenna patch layer both are above the substrate, and the thin film transistor, the pixel electrode and the common electrode all are above the signal shielding layer.

2. The array substrate according to claim 1, wherein the antenna patch layer comprises a plurality of antenna patches spaced apart, the plurality of antenna patches are arranged in multiple rows and multiple columns, and the substrate comprises a display area and a non-display area surrounding the display area, and the display area and the non-display area both are provided with a plurality of antenna patches.

3. The array substrate according to claim 1, wherein the antenna patch layer comprises a plurality of antenna patches spaced apart, the plurality of antenna patches are divided into two groups, and the two groups of antenna patches are respectively located on either side of the substrate along a length direction or a width direction.

4. An array substrate comprising:
a substrate;
a display element arranged above the substrate; and
an antenna structure for transmitting and receiving electromagnetic waves, wherein the antenna structure comprises a signal shielding layer and an antenna patch layer arranged on the substrate, the antenna patch layer and the signal shielding layer are spaced apart through a dielectric layer, and the antenna patch layer is beneath the signal shielding layer such that the antenna structure transmits electromagnetic waves towards the bottom of the substrate and receives the electromagnetic waves from the bottom of the substrate;
wherein:
the display element comprises a thin film transistor and a pixel electrode, the thin film transistor and the pixel electrode both are above the signal shielding layer;
the display element further comprises a common electrode,
an insulating layer is provided on a side of the substrate, wherein the substrate and the insulating layer both are between the antenna patch layer and the signal shielding layer to act together as the dielectric layer; the thin film transistor, the pixel electrode and the common electrode all are above the signal shielding layer.

5. A display panel comprising:
the array substrate according to claim 1; and
a counter substrate arranged in a counter manner with respect to the array substrate.

6. A man-machine interactive terminal comprising:
the display panel according to claim 5; and
a drive chip electrically connected with the antenna structure.

7. The man-machine interactive terminal according to claim 6, wherein a side edge of the array substrate goes beyond a corresponding edge of the counter substrate, a portion of the array substrate going beyond the counter substrate is provided with a conductive part,
the antenna patch layer comprises a plurality of antenna patches spaced apart, and each antenna patch of the plurality of antenna patches is electrically connected with the conductive part;
the man-machine interactive terminal further comprises a circuit board on which a connecting line is provided, and the drive chip is on the circuit board and electrically connected with the conductive part through the connecting line on the circuit board.

8. The man-machine interactive terminal according to claim 6, wherein the antenna patch layer comprises a plurality of antenna patches spaced apart,
the drive chip is on the substrate, and there are a plurality of the drive chips electrically connected with the antenna patches at a one-to-one basis.

9. The array substrate according to claim 4, wherein the antenna patch layer comprises a plurality of antenna patches spaced apart, the plurality of antenna patches are arranged in multiple rows and multiple columns, and the substrate comprises a display area and a non-display area surrounding the display area, and the display area and the non-display area both are provided with a plurality of antenna patches.

10. The array substrate according to claim 4, wherein the antenna patch layer comprises a plurality of antenna patches spaced apart, the plurality of antenna patches are divided into two groups, and the two groups of antenna patches are respectively located on either side of the substrate along a length direction or a width direction.

11. A display panel comprising:
the array substrate according to claim 4; and
a counter substrate arranged in a counter manner with respect to the array substrate.

12. A man-machine interactive terminal comprising:
the display panel according to claim 11; and
a drive chip electrically connected with the antenna structure.

13. The man-machine interactive terminal according to claim 12, wherein a side edge of the array substrate goes beyond a corresponding edge of the counter substrate, a portion of the array substrate going beyond the counter substrate is provided with a conductive part, the antenna patch layer comprises a plurality of antenna patches spaced apart, and each antenna patch of the plurality of antenna patches is electrically connected with the conductive part;

the man-machine interactive terminal further comprises a circuit board on which a connecting line is provided, and the drive chip is on the circuit board and electrically connected with the conductive part through the connecting line on the circuit board.

14. The man-machine interactive terminal according to claim 12, wherein the antenna patch layer comprises a plurality of antenna patches spaced apart, the drive chip is on the substrate, and there are a plurality of the drive chips electrically connected with the antenna patches at a one-to-one basis.

15. An array substrate comprising:
a substrate;
a display element arranged above the substrate; and
an antenna structure for transmitting and receiving electromagnetic waves, wherein the antenna structure comprises a signal shielding layer and an antenna patch layer arranged on the substrate, the antenna patch layer and the signal shielding layer are spaced apart through a dielectric layer, and the antenna patch layer is beneath the signal shielding layer such that the antenna structure transmits electromagnetic waves towards the bottom of the substrate and receives the electromagnetic waves from the bottom of the substrate;

wherein:
the display element comprises a thin film transistor and a pixel electrode, the thin film transistor and the pixel electrode both are above the signal shielding layer;

each display period of a display panel into which the array substrate is incorporated is divided into a display phase and a recognition phase, and wherein the signal shielding layer is used for receiving a reference voltage signal in the recognition phase and receiving a common voltage signal in the display phase, to be reused as a common electrode.

16. The array substrate according to claim 15, wherein the antenna patch layer comprises a plurality of antenna patches spaced apart, the plurality of antenna patches are arranged in multiple rows and multiple columns, and the substrate comprises a display area and a non-display area surrounding the display area, and the display area and the non-display area both are provided with a plurality of antenna patches.

17. The array substrate according to claim 15, wherein the antenna patch layer comprises a plurality of antenna patches spaced apart, the plurality of antenna patches are divided into two groups, and the two groups of antenna patches are respectively located on either side of the substrate along a length direction or a width direction.

18. A display panel comprising:
the array substrate according to claim 15; and
a counter substrate arranged in a counter manner with respect to the array substrate.

19. A man-machine interactive terminal comprising:
the display panel according to claim 18; and
a drive chip electrically connected with the antenna structure.

20. The man-machine interactive terminal according to claim 19, wherein a side edge of the array substrate goes beyond a corresponding edge of the counter substrate, a portion of the array substrate going beyond the counter substrate is provided with a conductive part, the antenna patch layer comprises a plurality of antenna patches spaced apart, and each antenna patch of the plurality of antenna patches is electrically connected with the conductive part;

the man-machine interactive terminal further comprises a circuit board on which a connecting line is provided, and the drive chip is on the circuit board and electrically connected with the conductive part through the connecting line on the circuit board.

* * * * *

UNITED STATES PATENT AND TRADEMARK OFFICE
CERTIFICATE OF CORRECTION

| | | |
|---|---|---|
| PATENT NO. | : 11,086,158 B2 | Page 1 of 1 |
| APPLICATION NO. | : 16/069764 | |
| DATED | : August 10, 2021 | |
| INVENTOR(S) | : Pengpeng Wang et al. | |

It is certified that error appears in the above-identified patent and that said Letters Patent is hereby corrected as shown below:

On the Title Page

Item [73], change BOE TECHNOLOGY GROUP CO., LTD to "BOE TECHNOLOGY GROUP CO., LTD."

Signed and Sealed this
Thirtieth Day of August, 2022

Katherine Kelly Vidal
*Director of the United States Patent and Trademark Office*